Aug. 27, 1929.   T. SUAREZ Y BERNAL   1,726,137
REEL FOR CABLES AND WIRE
Original Filed Nov. 17, 1926
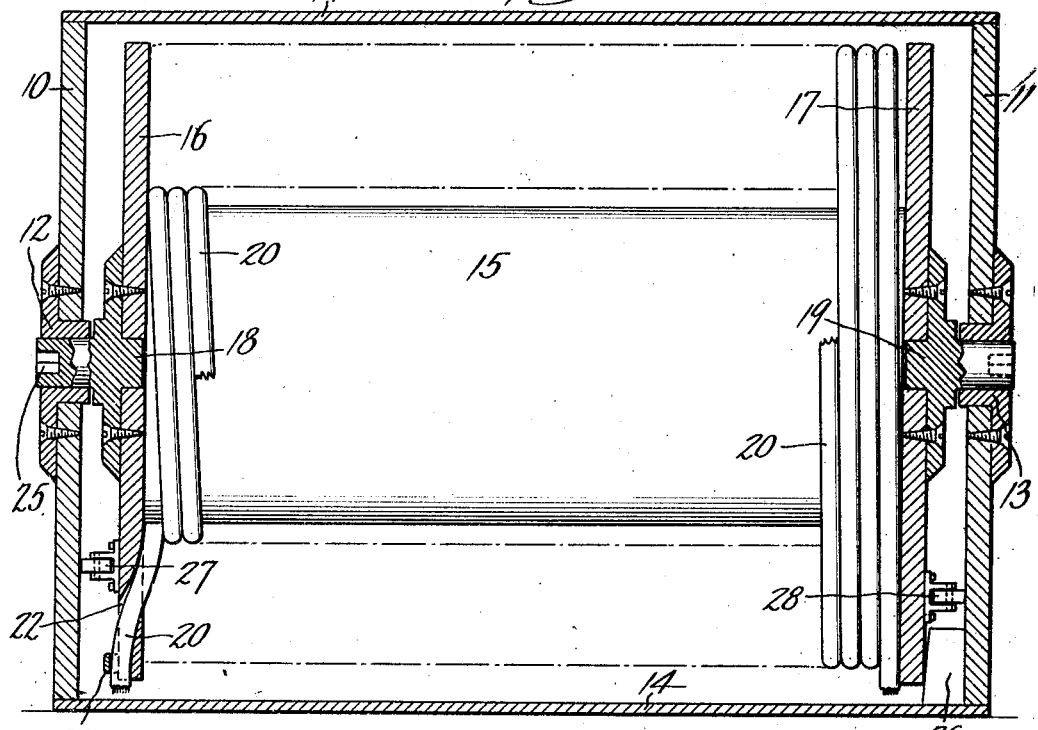
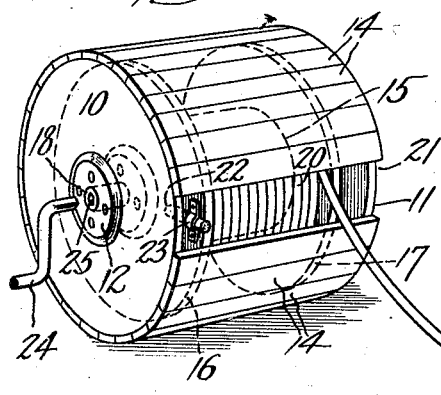
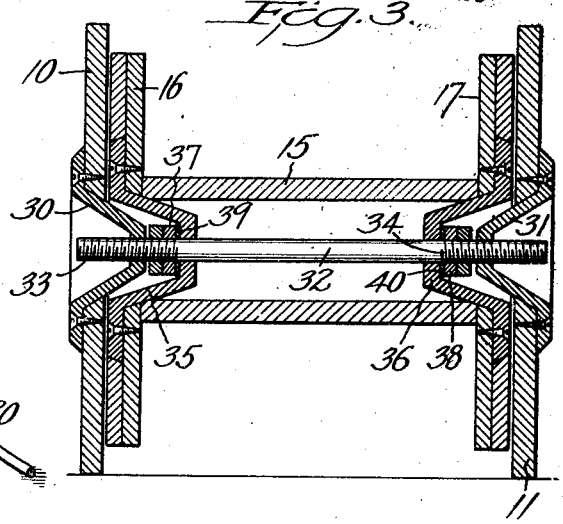
WITNESS
INVENTOR.
TOMAS SUAREZ Y BERNAL
BY
his ATTORNEY Patented Aug. 27, 1929.

1,726,137

UNITED STATES PATENT OFFICE.

TOMAS SUAREZ y BERNAL, OF SAN JUAN, PORTO RICO.

REEL FOR CABLES AND WIRE.

Original application filed November 17, 1926, Serial No. 148,943. Divided and this application filed May 6, 1927. Serial No. 189,233.

My present invention relates to reels for cables and wire, and more particularly, to a reel that will enable the wire or cable to be unwound without the necessity of lifting or jacking up the reel from the ground and without the necessity for removing the lagging from the entire circumference of the reel.

This is a continuation in part of application Serial No. 148,943 filed November 17, 1926.

Large electric cables and wires, such as the large lead sheathed cables used in underground transmission are commonly wound on large spools or reels. The cable has heretofore been protected from injury during shipment by means of longitudinal boards or lagging nailed to the outer peripheral edges of the reel. To unwind and remove the cable from such a spool or reel, it was necessary to remove all of the lagging from the entire circumference of the reel and to then pass a shaft axially through the reel or spool and jack up the shaft until the edges of the reel were lifted from the ground. The necessity of removing the lagging tended to injure the edge of the reels because the boards or lagging had to be nailed in and removed each time that the reel was filled and shipped. Moreover, owing to carelessness or other causes, the workmen frequently failed to return the lagging with the empty reel. Moreover, when the reel was a large one and was wound with a heavy cable, the lifting or jacking up of the reel involved some considerable labor.

These disadvantages are obviated by my present invention, an object of which is to provide a spool or reel for cables of all kinds which permits the cable to be unwound without the necessity of removing but a small part of the lagging.

Another object of the invention is to provide a spool or reel which permits the wire or cable to be unwound without the necessity of jacking up and supporting the reel.

Still further objects and features of the invention are to provide a permanent supporting portion for the reel that at all times holds the reel in a position to be freely rotated and to provide means whereby this reel may be locked from rotating relative to the supporting element; to provide a supported reel of the above type, that may be rotated within an enclosing and supporting structure without the necessity of pulling on the end of the cable; and, to provide a supported reel in which a cable wound thereon may be tested for breaks or defects without unwinding the cable or removing the lagging from the reel.

With these and other objects in view, which will be more readily apparent from the following description, the invention comprises the reel and supporting mechanism described in the following specification and claims.

The various features of the invention are illustrated in the accompanying drawings in which:

Fig. 1, is a longitudinal sectional view of a reel embodying a preferred form of the invention, Fig. 2 is a perspective view of a supported and covered reel, shown in Fig. 1, sufficient of the projecting lagging having been removed to illustrate the manner of unwinding the cable and, Fig. 3 is a longitudinal sectional view of the modified form of the reel.

In my present invention a reel on which an electric cable may be wound is rotatably supported on a pair of end supporting plates. In the preferred form of the invention the reel is entirely enclosed by means of lagging permanently secured to the peripheral edge portions of the supporting plate. The covering structure thus formed permits a cable to be inserted and secured to the reel when but one or two of the boards of the lagging are removed to permit the passage of the reel. The reel may then be rotated by appropriate means to wind the cable on the reel until the reel is filled with the proper length of cable. For shipping, the reel is then locked or secured to the supporting and enclosing structure and the space in the lagging is closed by fastening in place the removed boards. When the cable is to be unwound, the required opening is formed by removing the necessary boards of the lagging and the reel is unlocked and may be rotated to pass a desired length of cable out through the opening. When locked and enclosed in the supporting housing the reel moves as a unit with its enclosing structure as does the ordinary type of reel. When being wound or unwound with cable, the reel is not required to be lifted from the ground as it is always supported in a freely rotating position within its enclosing housing.

Referring, more particularly to the accompanying drawings, the supporting structure for the reel comprises a pair of end plates 10 and 11 having central bearings 12 and 13, mounted therein. The end plates 10 and 11 are kept in properly spaced position by means of lagging boards 14 which extend substantially around the circumference of the plates 10 and 11.

Within the cylindrical chamber thus formed there is supported in the bearings 12 and 13, a freely rotatable reel 15. The reel 15 is provided at each end with an end retaining plate 16 or 17, respectively, for retaining the cable on the reel. At each end of the reel there are also provided a pair of axially projecting trunnions 18 and 19, rotatably mounted in the bearings 12 and 13, respectively. Thus the reel 15 is rotatably supported in the bearings 12 and 13 and may rotate freely within the chamber formed by the supporting plates and the lagging 14. The diameter of the supporting plates 10 and 11 is larger than the diameter of the reel end plates 16 and 17 by a small amount just sufficient to insure a free rotation of the reel. The diameter of the structure as a whole is, therefore, not appreciably increased over that of the ordinary reel of the same capacity. Similarly the distance between plates 10 and 16 and 11 and 17, is just sufficient to provide the required clearance.

In winding a cable 20 upon the reel 15 one or more of the lagging boards are removed to provide an entrance space as shown at 21 in Fig. 2. One end of the cable may be inserted through this space and then pass through an opening 22 in the end plate 16 and be secured thereto by means of a properly curved plate 23 that may be secured to the outer face of the plate 21. With this arrangement the end of the cable 20 is flush with or projects slightly from the edge of the plate 16 so that electric contact may be made therewith for testing purposes.

With the end of the cable thus secured, when the reel 15 is rotated the cable is drawn into the enclosing structure and automatically wound on the reel. The reel 15 may be conveniently rotated by a crank 24 by having a square end adapted to be inserted in and fit a square socket 25 in an end of the trunnion 18. When the required length of cable is wound on the drum, a wedge 26 may be inserted through the opening 21 and driven between the end plate 17, and the end supporting plate 11 to thus anchor or lock the reel in a unitary manner with the enclosing housing, so that the supporting housing may be rolled in the usual manner without causing the cable or reel therewithin to rotate relatively to its enclosing structure. When the opening is closed by suitable lagging, the wedge 26 is thereby positively secured in position. To unwind the cable from the reel, it is merely necessary to remove sufficient lagging to expose the wedge 26 and provide a space 21 through which the cable may be passed. The remaining portion of the lagging remains undisturbed and there is, therefore, no wearing or destruction of the edge of the reel, or of the supporting plates 10 and 11. The removable lagging may be nailed in the usual manner or secured by other securing means so that its removal and replacement need not injure the edge of the supporting plates 10 and 11. To prevent any possibility of a rubbing of the plates 16 or 17 against the plates 10 and 11 respectively and to support these plates in proper spaced relation, rollers 27 and 28 may be mounted on the plates 16 and 17 and contact with plates 10 and 11 respectively.

In Fig. 3 is shown a slightly different type of reel which may be used when it is not desired to use a lagging or when a removable lagging is to be used. In this construction frustro-conical bearings 30 and 31 are provided in the supporting plates 10 and 11, and a shaft 32 for supporting the reel 15 is mounted in these bearings. The shaft 32 is provided at its ends with right handed and left handed screws 33 and 34, respectively, so that by rotating the plates 10 and 11 in one direction relative to the shaft 32, the plates approach each other until they contact with the plates 16 and 17, respectively, and lock the supporting plates tightly against the end plates of the reel. By rotating the end plates in the reverse direction on the shaft the reel is freed.

The reel is provided with a similar pair of frustro-conical supporting bearings 35 and 36, which are supported on an unthreaded part of the shaft 32, so that they may rotate freely relative to the supporting plates 10 and 11. The shaft 32 is retained in its proper place relative to the bearings 35 and 36 by means of sets of locked nuts 37 and 38 on the threaded portion of the shaft 32, suitable washers 39 and 40 being provided between the locked nuts on the adjacent faces of the bearings 35 and 36.

With this construction the supporting plates may be very quickly and readily locked against the end plates of the reel and very quickly released therefrom. The lagging may be nailed to and removed from the edge portions of the supporting plates 10 and 11 in the usual manner. This construction is, however, not to be used when a permanent lagging is desired.

Through my above described invention the cable is at all times enclosed within a suitable housing from which it may be removed as desired, without destroying any portion of the housing and in which it may be locked and thereupon transported and handled in the same manner as the usual type of reel. The invention also provides means by which the cable may be tested while still enclosed in the housing.

As changes of construction could be made within the scope of my invention, it is intended that all matter contained in the above description or shown in the accompanying drawing shall be interpreted as illustrative and not in a limiting sense.

Having now described my invention, what I claim as new and desire to secure by Letters Patent is:

1. Apparatus of the type described which comprises a reel adapted to have a cable wound thereon and having end plates, a pair of supporting plates slightly spaced from said end plates, bearings mounted centrally of said supporting plates, trunnions projecting axially from said reel and mounted in said bearings, rollers between the end plates of said reel and said supporting plates, an opening in one of the end plates of said reel and means for securing an end of said cable in said opening, and lagging extending around the periphery of said supporting plates to enclose said reel.

2. Apparatus of the type described, which comprises a spool having end plates, supporting plates of slightly larger diameter than the outside of said end plates and adapted to support a covering lagging, a shaft supported in said supporting plates and extend through and supporting said spool, and means continuously associated with said supporting plates for supporting said end plates throughout their outer surfaces against lateral thrust.

3. Apparatus of the type described, which comprises a reel adapted to have a cable mounted thereon and having end plates, a pair of supporting plates slightly spaced from said end plates and adapted to support a covering lagging, bearings mounted centrally on said supporting plates, trunnions projecting axially from said reel and mounted in said bearings, said trunnions having square sockets in their projecting ends, and means continuously connected to and associated with said supporting plates for supporting and receiving end thrusts of said reel on the faces of said supporting plates.

In testimony whereof I hereunto affix my signature.

TOMAS SUAREZ y BERNAL.